Nov. 11, 1930.  P. B. LIEBERMANN  1,781,235

JOURNAL BOX

Filed April 22, 1925

INVENTOR;
PAUL B. LIEBERMANN,
BY
HIS ATTORNEY.

Patented Nov. 11, 1930

1,781,235

UNITED STATES PATENT OFFICE

PAUL B. LIEBERMANN, OF NEW YORK, N. Y., ASSIGNOR TO GENERAL MOTORS CORPORATION, OF DETROIT, MICHIGAN, A CORPORATION OF DELAWARE

JOURNAL BOX

Application filed April 22, 1925. Serial No. 24,961.

This invention relates to journal boxes and comprises all the features of novelty herein disclosed as embodied in a railway journal box having provision for lateral thrust.

An object of the invention is to provide improved thrust taking instrumentalities between an axle or shaft and its journal box. Another object is to provide improved means for securing a thrust plate to a journal box whereby it can be readily attached or adjusted without removing the journal box or its cap. Another object is to provide an improved thrust plate and lubricating means therefor.

To these ends and also to improve generally upon devices of the character indicated my invention consists in the various matters hereinafter described and claimed.

In the drawings, Figure 1 is a vertical section.

Figures 1, 2:
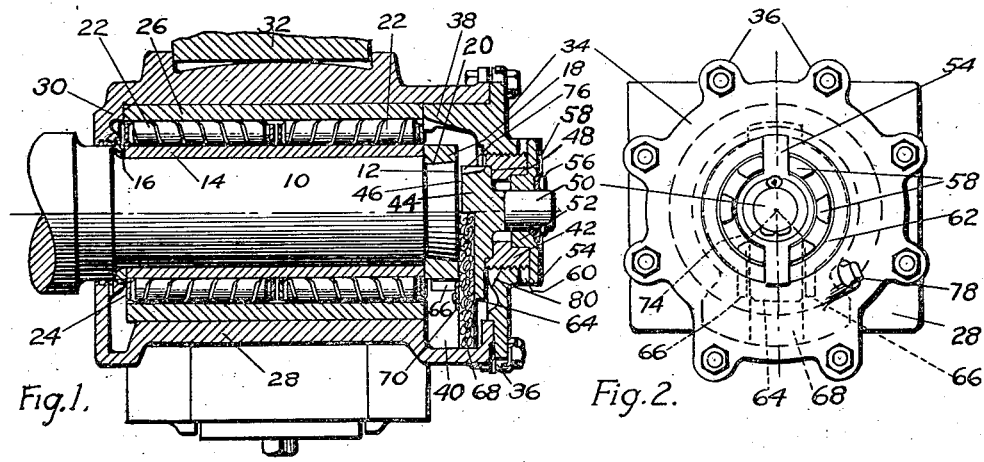
Figure 2 is an end elevation.

Referring to Figures 1 and 2 the numeral 10 indicates a car axle or shaft which has its end faced off smooth to form a thrust surface 12. Axles or shafts having a plain cylindrical bearing with a collar at the end may be adapted for use with roller bearings by turning down the shaft to receive a sleeve 14 held against a shoulder or filler ring 16 by a shrink collar 18 on the reduced end 20 of the shaft. Roller bearings 22 held in cages 24 run between the sleeve 14 and a lining 26 pressed into the bore of a journal box 28 against a flange 30. The journal box is mounted in any suitable way to rock with respect to car frame members indicated generally at 32.

An end cap 34 with lugs 36 is bolted to the journal box to complete the latter and has a part 38 extending into the box to the end of the lining 26. At the bottom of the box, adjacent to the end cap, is a depression or enlargement forming an oil well 40. Opposite the end of the axle or shaft 10, the cap has an opening closed by a member, herein shown as a nut 42, threaded in the opening. The nut carries a thrust plate or button 44 having a thrust face 46 for cooperation with the smooth end of the shaft. The thrust plate has a circular part 48 set in a circular recess in the nut, with a holding stud 50 extending through the nut.

A spider comprising a circular central part 52 and a pair of radial arms 54 is sleeved on the end of the stud and secured by a washer and a cotter pin 56. The nut 42 has a series of outwardly extending spaced projections 58 between pairs of which the arms 54 of the spider project. The arms also extend radially outwardly and enter opposite notches 60 in a sleeve-like extension 62 of the cap to hold the nut against turning. By removing the spider, washer, and cotter pin, the nut can be turned to adjust the thrust faces 12 and 46 to the desired running clearance. The proper projections 58 are selected and placed in registration with the notches 60 and the spider is again applied.

The thrust plate 44 has a depending radial extension 64 which passes between spaced ribs or lugs 66 to hold the thrust plate against turning with the axle. The lower part of the thrust plate has a recess in which a wick 68 of felt or the like is secured, the wick extending down into the oil well 40. The wick is a little thicker than the depth of the groove so that when the thrust faces come in contact, the wick will be squeezed to extract some oil and deliver it to said thrust faces. The wick is held by a plate 70 and rivets to the thrust plate extension 64 and, if desired, the upper end of the wick may be enlarged to enter an enlargement of the recess. The sides of the recess and wick taper at 74 so as not to unduly decrease the area of the thrust faces. The upper end of the thrust plate has an inclined groove 76 to direct oil to the thrust faces. The end cap has a plug 78 for lubrication and inspection.

The thrust plate and wick are removable from the journal box and replaceable therein as a unit without removing the journal box end cap 34. Upon the removal of the nut 42, the thrust plate and wick can be tilted and lifted out through the opening. To facilitate this action, the cap is cut out at 80 on a slant.

Figures 3, 4:
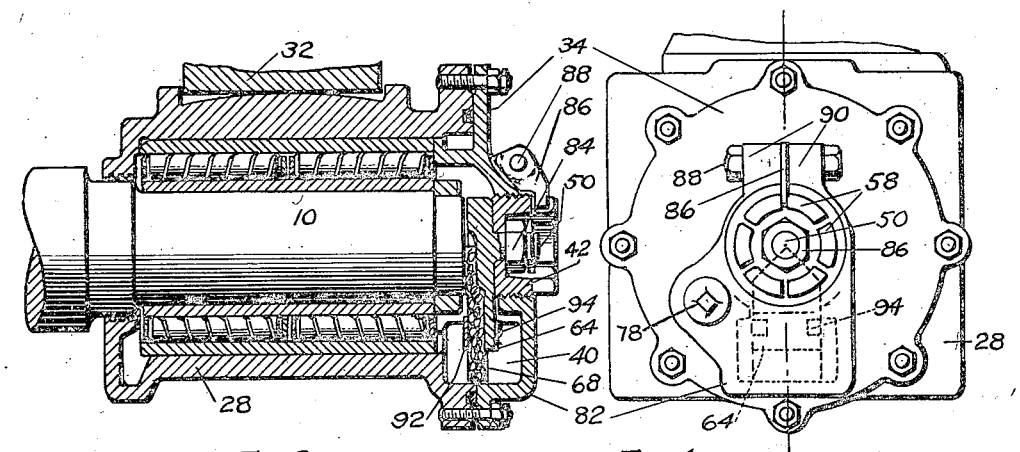
Figure 3 is a vertical section of another form of the invention and Figure 4 is an end elevation thereof.

In Figures 3 and 4, the construction is similar. The capacity of the oil well 40 is increased by a supplementary bottom enlargement or extension 82 on the end cap 34. The enlargements forming the oil well directly communicate each with the other at the bottom of the box. The holding stud 50 of the thrust plate is threaded to receive a nut 84 and lock nut. The nut 42 is held against turning by a key 86 hung on a clamping bolt 88 extending between lugs 90 on split sections of the end cap 34. The wick 68 is secured to extension 64 by a clip 92 the sides of which engage slots 95 in the thrust plate extension 64 and are bent around said extension at 94. The wick and the extension 64 are offset from the rounded edge of the axle and its collar to allow oil to work around the collar to the bearings and to facilitate removal of the thrust plate through the opening afforded by the removable nut 42. To adjust the nut 42 and the thrust plate, the nut 84 and the clamping bolt 88 are loosened and the key 86 raised from between the spaced projections 58.

Although the invention has been described by reference to certain specific embodiments, it should be understood that, in its broader aspects, it is not necessarily limited to the forms selected for illustrative purposes.

I claim:

1. In a device of the character described, a journal box, a shaft journalled therein, a cap for the end of the box, said cap having an opening opposite the end of the shaft, a detachable closure member for the opening, a thrust plate having on one side a holding stud extending through the closure member and on the other side a thrust face with a recessed portion, a wick supported within the recessed portion of the thrust face and extending into the lower part of the journal box, said plate and wick being removable as a unit through said opening; substantially as described.

2. In a device of the character described, a journal box having an oil well at one end, a shaft journalled in the box, a cap forming the end of the box, a thrust plate, means for rigidly mounting the thrust plate on the end cap in a plurality of selected positions for contact with the end of the shaft, and a wick held in a recess of the thrust plate and extending into the oil well; substantially as described.

3. In a device of the character described, a journal box having an oil well at one end, a shaft journalled in the box, a cap forming the end of the box, a thrust plate carried by the cap and arranged to contact with the end of the shaft, and a wick held in a recess of the thrust plate and extending into the oil well, said wick being thicker than the depth of the recess and arranged to be pressed into the latter by the shaft; substantially as described.

4. In a device of the character described, a journal box having an oil well at one end, a shaft journalled in the box, a cap forming the end of the box, a thrust plate, means for rigidly mounting the thrust plate on the end cap in a plurality of selected positions for contact with the end of the shaft, said plate having a recess opposite the lower part of the shaft, a wick extending into the oil well and into the recess, and means for securing the wick to the plate; substantially as described.

5. In a device of the character described, a journal box, a shaft journalled therein, a cap for the end of the box, a thrust plate having a thrust face opposite the end of the shaft and a depending extension, a stud rigidly connected to the plate and detachably secured to the cap, and a pair of spaced ribs embracing the extension for preventing rotation of said thrust plate; substantially as described.

6. In a device of the character described, a journal box, a shaft therein, a thrust plate for said shaft and having a radial extension upon one side projecting beyond the circumference of said shaft, a lubricant-yielding member between said shaft and said plate and upon said extension, and means for securing said member to said extension at a point beyond the shaft; substantially as described.

7. In a device of the character described, a journal box, a shaft therein, a thrust plate for said shaft and provided with an extension which projects beyond the circumference of said shaft and with a slot in its thrust-receiving face, a lubricant-yielding member in said slot and upon said extension, and means for securing said member to said extension; substantially as described.

8. In a device of the character described, a journal box, a shaft therein, a thrust plate for said shaft and provided with an extension at one side thereof, a lubricant-yielding member extending along one face of said plate and its extension, fastening-means securing said member to said extension and extending along the sides thereof, and projections upon said box between which said extension is received; substantially as described.

9. In a device of the character described, a journal box, a shaft therein, a thrust plate for said shaft and provided with an extension at one side thereof, said extension having slots at its edges, a lubricant-yielding member extending along one face of the plate and said extension, a fastening-means for said member and having portions which extend into said slots, and projections upon said box between which said extension is received; substantially as described.

10. In a device of the character described, a journal box having an end-closure provided with an opening, a shaft in said box, a plug received in said opening and rotarily adjustable to move it toward and from said shaft and having a plain circular seat therein, a shaft-engaging thrust plate having a plain circular portion rotatably received in said seat whereby said plug is angularly movable without disturbing the angular position of said plate, a lubricant conveying wick projecting from the thrust plate, and means for securing said plate to said plug; substantially as described.

11. In a device of the character described, a journal box having an end-closure provided with an opening, a shaft in said box, a plug received in said opening and rotarily adjustable to move it toward and from said shaft, means for fastening said plug in adjusted position, a shaft-engaging thrust plate secured upon said plug but with relation to which said plug is angularly movable, a lubricant conveying wick projecting from the thrust plate, and means for holding said plate against rotation with said plug; substantially as described.

12. In a device of the character described, a journal box having an end-closure provided with an opening, a shaft in said box, a plug received in said opening and rotarily adjustable to move it toward and from said shaft, means for fastening said plug in adjusted position, a shaft-engaging thrust plate secured upon said plug but with relation to which said plug is angularly movable, an extension upon said plate, a lubricant-yielding wick upon said extension and plate, and projections upon said box between which said extension is received; substantially as described.

13. In a device of the character described, a journal box having at its lower side a hollow enlargement forming an oil well, a shaft in said box above said well, a removable cap for said box having an enlarged, hollow lower portion supplementary to the well, the enlargements forming the oil well directly communicating each with the other at the bottom of the box, a thrust plate secured to said cap above said well, and a wick secured upon said plate and extending into said well; substantially as described.

14. In a device of the character described, a journal box having an oil well at one end, closure means for the end of the box, a shaft journalled in the box, a thrust plate rigidly mounted with respect to the closure means, said plate having on one side a holding stud extending through the closure means and having on the other side a thrust face to engage the end of the shaft, and a wick fastened to the thrust plate and lying in a recess thereof, the lower end of the wick extending into the oil well; substantially as described.

15. In a device of the character described, a journal box, a shaft journalled in the box and having a smooth end thrust face, a cap closing the end of the box and having its lower portion enlarged to contain lubricant, a thrust plate fixed to the end cap for engaging the thrust face of the shaft, and a wick secured to the thrust plate and extending to the enlarged lower portion of the end cap; substantially as described.

In testimony whereof I hereunto affix my signature.

PAUL B. LIEBERMANN.